NOISE CONTROL IN COMPOSITE TRANSMISSION SYSTEMS

Filed July 26, 1965 2 Sheets-Sheet 1

INVENTOR.
JOHN R. SCANTLIN
BY HIS ATTORNEYS
HARRIS, KIECH, RUSSELL & KERN

INVENTOR.
JOHN R. SCANTLIN
BY HIS ATTORNEYS
HARRIS, KIECH, RUSSELL & KERN 3,371,277

NOISE CONTROL IN COMPOSITE TRANSMISSION SYSTEMS

John R. Scantlin, Los Angeles, Calif., assignor to Scantlin Electronics, Inc., Los Angeles, Calif., a corporation of Delaware Filed July 26, 1965, Ser. No. 474,595
14 Claims. (Cl. 325—42)

This invention relates to information transmission systems for handling more than one input information source on a single carrier such as a composite transmission system utilizing phase shift and amplitude modulation. The system of the invention is primarily intended for use with existing radio transmission channels to provide for additional data transmission facilities but, of course, is equally suitable for use with new installations. The system of the present invention is an improvement on the system described in my U.S. Patent No. 3,160,812.

The aforesaid Scantlin patent provides an information transmission system for use with a conventional amplitude modulation radio channel such as a commercial broadcasting station to provide for transmission of data in binary form concurrent with the audio frequency signal without disturbing the audio frequency signal in any way. For continuous transmission of the binary data, a radio frequency signal must be continuously radiated to serve as a carrier for the binary data signal. However, during periods of heavy amplitude modulation by the audio signal, the energy in the transmitted radio frequency signal will be zero or nearly so for brief periods of time during which no binary data can be sent or the accuracy of the binary data signal cannot be relied upon. It is an object of the invention to provide a new and improved transmission system for operating during the momentary reduction in transmitted signal level without producing errors in data transmission and without loss of data. It is an object of the invention to provide a composite transmission system which determines when poor data transmission is occurring or about to occur and which provides information to the receiver indicating this fact. A further object is to provide such a system in which data transmission is delayed during periods of poor transmission and in which a control code for the receiver is sent in place of the information data, permitting the receiver to ignore the binary signals received during the periods of poor transmission.

It is an object of the invention to provide a composite information transmission system for transmitting information in binary form from a binary source and audio frequency information from an audio source all on a single carrier, and including means for generating the radio frequency carrier, means for varying the phase of the carrier as a function of the binary information, means for amplitude modulating the carrier as a function of the audio frequency information, means for determining when the modulation exceeds predetermined limits, means for delaying transmission of the binary information, and means for transmitting control instructions in binary form in place of the binary information. A specific object is to provide such a system including an audio signal analyzer which will anticipate when excessive modulation will occur to send an ignore instruction for the receiver to ignore subsequent binary information for a particular period of time or until a resume instruction is received. Another object is to provide such a system in which an ignore instruction is transmitted following a period of excessive modulation instructing the receiver to ignore previously transmitted binary data and in which the data transmitted during the poor period of transmission is stored and retransmitted. An additional object is to provide such a system in which the audio frequency signal is delayed providing time for modulation analysis and transmission of ignore instructions prior to transmission of the excessive modulating audio signal.

It is an object of the invention to provide in a composite transmission system, an audio signal modulation level analyzer means for determing when the signal from the audio source exceeds a predetermined value and producing a control signal when such value is exceeded, means for connecting the audio source to the analyzer and to the modulator means, generator means for generating an ignore signal in binary form, means for connecting the ignore signal and the binary source to the control means of the binary portion of the transmitter, and means for connecting the control signal to the generator means to produce the ignore signal and connecting the control signal to the binary source to introduce a delay in binary information transmission therefrom. An additional object is to provide such a system which may utilize various mechanisms for analyzing the audio signal. A further object is to provide such a system which may utilize various forms of codes and code generating means for providing the control instructions to the receiver.

The invention also comprises novel combinations and arrangements of parts, which will more fully appear in the course of the following description. The drawings merely show and the description merely describes preferred embodiments of the present invention which are given by way of illustration or example.

Figure 1:
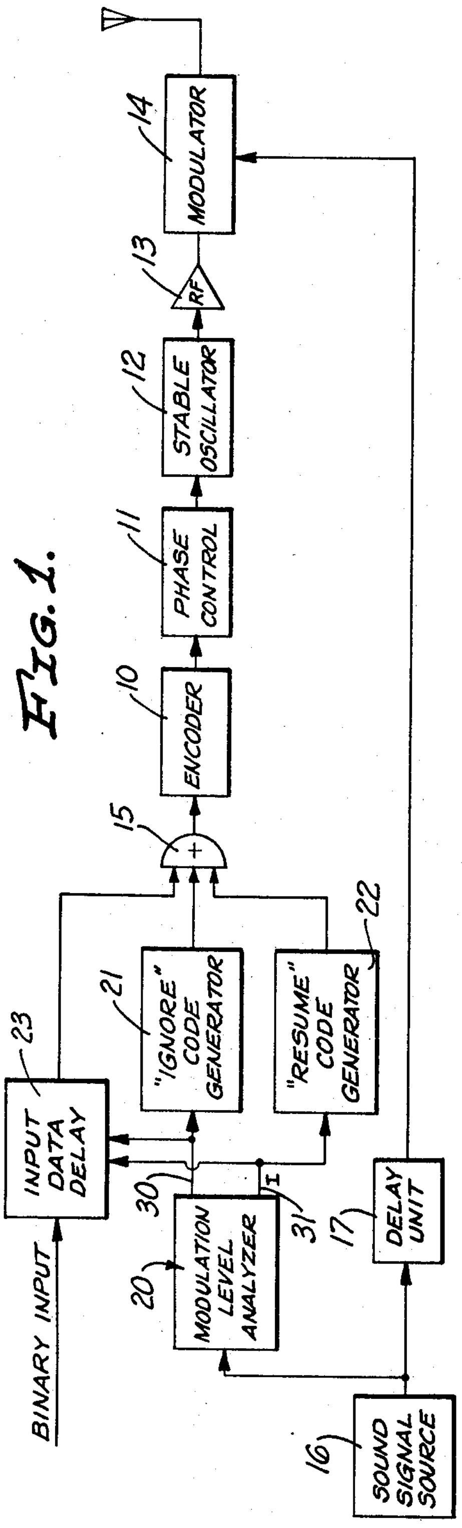
FIG. 1 is a diagram of a composite system transmitter incorporating a preferred form of the present invention.

A substantial portion of the transmitter and receivers used with the present invention may be conventional in design and operation and reference may be made to the aforementioned U.S. Patent No. 3,160,812 for further information thereon. Referring to FIG. 1, the transmitter illustrated therein includes an encoder 10, a phase control unit 11, a stable oscillator 12, a radio frequency amplifier 13, and a modulator 14. The output from an OR gate 15 provides the input to the encoder. The encoder 10 converts a standard binary code to an A.C. code which is a pulse code in binary form having a zero average value. The encoder output drives the phase control unit to provide very small shifts in phase of the carrier frequency output of the stable oscillator. The magnitude of phase shift of the carrier is preferably very small, ordinarily in the range of plus and minus 180° or less, with a positive change or shift corresponding to one level and hence one state of the code and a negative change or shift corresponding to the other level and other state of the code. The shifted carrier is then amplitude modulated in the conventional manner by the audio signal from a sound signal source 16. In the embodiment of FIG. 1, the sound signal source is connected to the modulator through a delay unit 17 which introduces a predetermined amount of delay in transmission between the source and the modulator. The delay unit 17 may be a conventional device, such as a tape recorder capable of simultaneous record and playback with the playback head spaced down the tape from the record head, or a modulator and delay line of the magnetostrictive or piezoelectric or supersonic type.

The transmitter of FIG. 1 also includes a modulation level analyzer 20, an ignore code generator 21, a resume code generator 22, and an input data delay unit 23. The input data delay unit 23 provides for a delay of a controlled period of time in transmission of binary data between the binary data source and the OR gate 15. Typically this could be a shift register but it should be kept in mind that the output rate of many data sources can be controlled directly so that no separate delay unit is required. Hence some embodiments of the transmitter of the invention will incorporate a separate delay unit operating under the control of the transmitter while other embodiments will provide the delay control signals for connection to the data source.

In the system of FIG. 1, the audio signal to the modulator is delayed in the unit 17 so that the audio signal can be analyzed before the excessive modulation actually occurs. If the results of the analysis indicate that the modulation will be at such a level that poor data transmission will result, the input data is held up at the delay unit and an ignore code is transmitted in lieu of input data before the high level modulating audio signal is applied to the transmitter. When the analysis of the audio signal indicates that satisfactory transmission is again possible, a resume code is sent and the delay in the binary input is terminated.

The undelayed audio signal from the source 16 is connected to the modulation level analyzer 20 which may be a conventional circuit, such as a slicer in the form of a biased diode and a high gain amplifier. An output signal from the analyzer indicating excessive audio modulation is coupled to the ignore code generator on line 30. The generator 21 is triggered to generate an ignore code for transmission to the encoder 10 through the OR gate 15. At the same time, the signal on the line 30 initiates the delay of the binary input.

When the audio signal level reduces to a favorable value, the inverse output of the analyzer, through an inverter or through a separate output line 31, triggers the resume code generator 22 to provide a resume code to the gate 15 and also provides a signal for terminating the delay of binary input data. Of course, the start of binary input data transmission must be held until the transmission of the resume code is completed. This may be accomplished with a short fixed delay in the unit 23. Alternatively, a single output from the analyzer 20 could be used, with an output signal above a certain level or a positive going signal or the like triggering the ignore generator 21 and initiating the delay, and with an output signal below a certain level or a negative going signal or the like triggering the resume generator 22 and terminating the delay. Actually this system is the equivalent of the previously described system, since the inverted sensitivity of the resume generator 22 corresponds directly to the normal sensitivity and an inverted input signal.

The ignore and resume codes may take the form of special characters interspersed in the normal stream of information characters or may take the form of an information bit of a special length, not likely to occur in the ordinary information patterns being sent. For telegraph signalling of ordinary English language, two or three consecutive letters which would not occur in the text would be satisfactory. For example, the combinations of QQ, HHH, UUU, VVV do not occur in English text. A simpler code is the all zero character which is not used in telegraph systems. This could be used as an ignore code in conjunction with an all one resume code. The choice of particular code will depend upon equipment cost and reliability requirements as well as the time available for sending the special codes, the latter being related to the amount of anticipation available and the frequency of information interruptions encountered.

The receiver for the audio frequency signal may be entirely conventional. A substantial portion of the receiver for the binary data may also be conventional and reference may be made to the aforesaid Patent No. 3,160,-812 for information on the receivers. The receiver of FIG. 4 of the present application corresponds to the receiver of FIG. 3 of the aforementioned patent, with one system for recognizing the ignore and resume codes incorporated therein. The receiver includes a radio frequency amplifier 35, a local oscillator 36, a mixer 37, an intermediate frequency amplifier 38, a phase detector 39 and a decoder 40. A binary output is provided on lines 41, 42 corresponding to the binary input to the encoder 10 of the transmitter.

Figure 4:
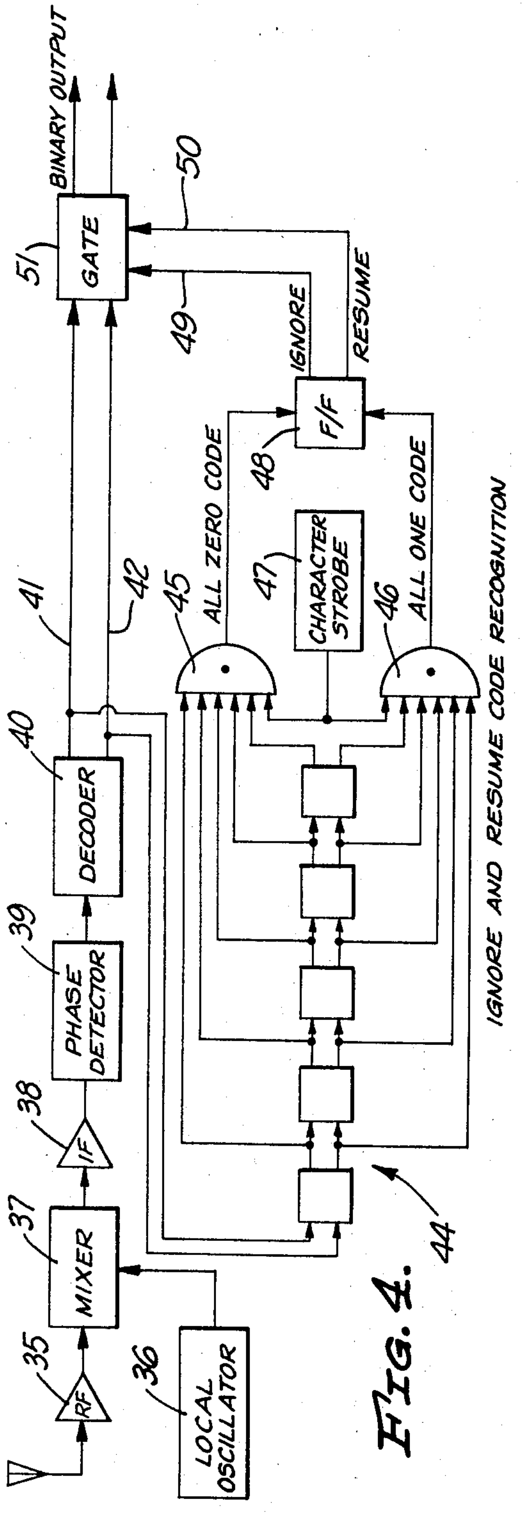
FIG. 4 is a diagram of a receiver for the binary phase shift transmitted data.

The specific receiver illustrated in FIG. 4 is designed for use with a five-bit code utilizing all zeros for the ignore signal and all ones for the resume signal. The binary output and the complement thereof appearing on lines 41, 42 are connected as inputs to a five-bit shift register 44. The output from each element of the shift register is connected as an input to an AND gate 45 and the complement of the output of each bit of the shift register is connected to another AND gate 46. A character strobe unit 47 provides a strobe pulse to each of the AND gates 45, 46 at the end of each character. An all zero character provides an output from the gate 45 and causes a flip-flop 48 to produce an ignore pulse on an output line 49. Similarly, an all one character produces an output from the gate 46 to the flip-flop 48 changing the flip-flop to the opposite state and producing a pulse on the resume line 50. A gate 51 may be connected in the binary output line for blocking transmission on receipt of an ignore signal on the line 49 and for permitting transmission to resume on receipt of a resume signal on the line 50. It will be realized that the particular form of control circuit utilized in the receiver will depend upon the form of the ignore code utilized at the transmitter and that variations and modifications are well within the ability of one skilled in the digital control field.

Figure 2:
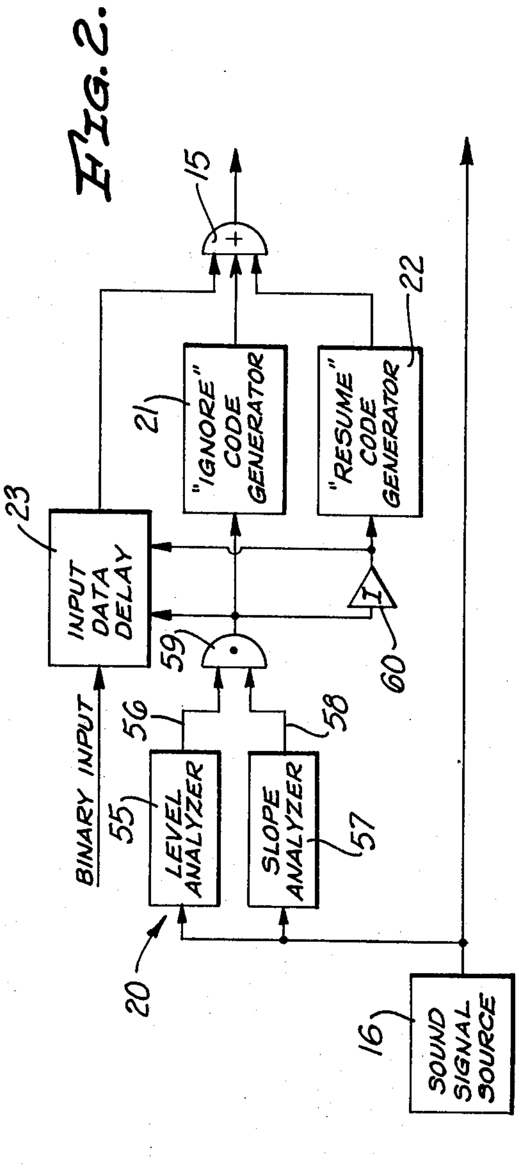
FIG. 2 is a diagram of a portion of a transmitter illustrating an alternative form of the invention.

An alternative system which does not utilize the audio signal delay unit is illustrated in FIG. 2, wherein components corresponding to those of the system of FIG. 1 are identified by the same reference numerals. In this system, the occurrence of excessive modulation is predicted by a different form of modulation level analyzer. The principle of analysis is based on the conclusion that when the instantaneous level of the audio signal is large and negative and the slope or rate of change of the audio signal is large and negative, a period of excessive modulation and poor data transmission will follow. Since the period of poor transmission is predicted ahead of time, there is no need for a delay in transmission of the audio signal between the source and the modulator. In the modulation level analyzer, a level analyzer 55, typically a slicing amplifier, analyzes the audio signal level and polarity, providing an output on line 56 when the audio signal exceeds a particular magnitude and is negative. A slope analyzer 57, which may be a differentiating amplifier, analyzes the slope or rate of change of the audio signal and provides an output on line 58 when the slope is greater than a predetermined magnitude and negative. The outputs on lines 56 and 58 are combined at an AND gate 59 which produces a signal to trigger the ignore code generator 21 and actuate the input data delay 23. The decay of the output from the AND gate 59 when the adverse audio condition passes, operates through an inverter 60 to trigger the resume code generator 22 and terminate the delay at the unit 23.

The system of FIG. 2 may be operated in another manner with the slope analyzer 57 and the AND gate 59 omitted. This system utilizes the principle that the audio signal which provides a modulating wave form is basically symmetrical and that a large positive peak will be followed by a large negative peak, the latter providing the adverse modulation. The level analyzer 55 is set to provide an output for a high positive level of audio signal, anticipating a large negative level following thereafter. The output from the analyzer 55 provides the triggering for the generators and delay in the manner described above.

Figure 3:
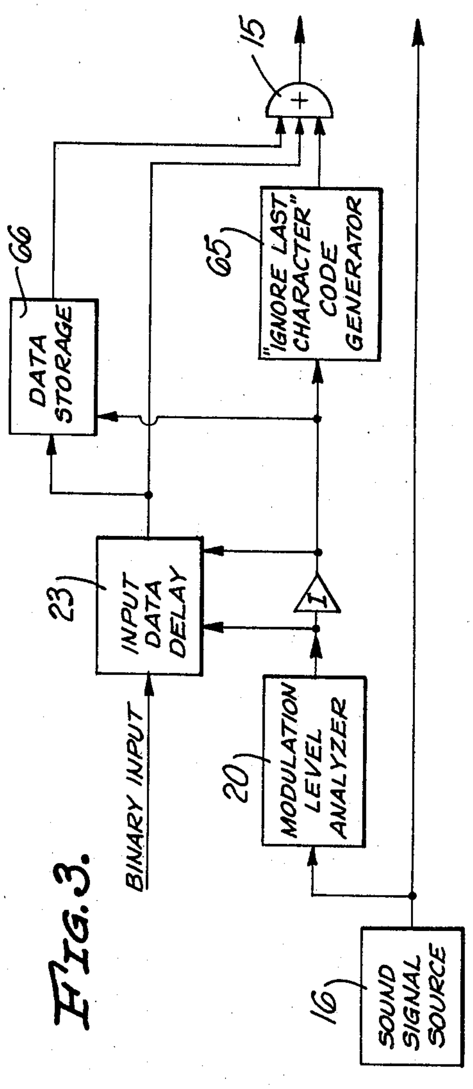
FIG. 3 is a diagram of a portion of a transmitter illustrating another alternative form of the invention.

Another form of the system is illustrated in FIG. 3, wherein components corresponding to those of FIGS. 1 and 2 are identified by the same reference numerals. Following a period of poor transmission, a code is sent to the receiver to notify the receiver of this fact and the binary information transmitted during the poor period is retransmitted. At the receiver, the first set of characters are deleted and the new set is substituted. An output signal from the modulation level analyzer 20 is produced when the audio signal exceeds the predetermined limits. This signal triggers a code generator 65 and the input data delay 23 and a data storage unit 66. The code generator 65 may be identical to the code generator 21 of FIG. 1 but is interpreted at the receiver as an instruction to ignore the preceding character or characters rather than the following character or characters. The binary data from the delay 23 is connected to the gate 15 directly and also through a storage unit 66. Typically the storage unit 66 may be a shift register which provides for storage of one or more data characters as desired.

When the modulation level analyzer 20 indicates that excessive modulation has occurred, further binary data transmission is delayed by the unit 23. When the level analyzer indicates that the excessive modulation no longer exists, the receiver is ordered to ignore or discard the preceding character or characters by the code from the generator 65, then the characters stored in the storage unit 66 are transmitted to replace the discarded or ignored characters, and then direct binary data transmission through the unit 23 is resumed. The system may be set to ignore and retransmit a single character or a fixed number of characters each time the modulation level analyzer indicates excessive modulation. In an alternative mode of operation, the quantity of data retransmitted from storage may be controlled by the duration of the period of excessive modulation.

When utilizing the retransmit scheme of FIG. 3, a temporary storage such as a shift register may be incorporated in the receiver between the decoder and the output gate 51 so that the previously transmitted character or characters are available for ignoring or discarding.

The invention provides several systems for effectively determining the existence of the momentary reduction in transmitted signal level resulting from excessive modulation and sending a distinctive code so that the receiver output containing the questionable data may be ignored, with good data following thereafter.

Although exemplary embodiments of the invention have been disclosed and discussed herein, it will be understood that other applications of the invention are possible and that the embodiments disclosed may be subjected to various changes, modifications and substitutions without necessarily departing from the spirit of the invention.

I claim as my invention:

1. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source exceeds a predetermined value and producing a control signal when said value is exceeded;

means for connecting the audio source to said analyzer and to the modulator means;

generator means for generating an ignore signal in binary form;

means for connecting said ignore signal and the binary source to the control means; and means for connecting said control signal to said generator means to produce said ignore signal and connecting said control signal to the binary source to introduce a delay in binary information transmission therefrom.

2. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source exceeds a predetermined value and producing a first control signal when said value is exceeded and a second control signal when said value is no longer exceeded;

means for connecting the audio source to said analyzer and to the modulator means;

generator means for generating an ignore signal and a resume signal in binary form;

means for connecting said ignore signal, said resume signal and the binary source to the control means; and means for connecting said control signals to said generator means to produce said ignore signal and said resume signal and connecting said control signals to the binary source to introduce a delay in binary information transmission therefrom.

3. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source exceeds a predetermined value and producing a control signal when said value is exceeded;

means for connecting the audio source to said analyzer and to the modulator means, including a delay unit between the source and the modulator means for delaying the audio signal for a period of time;

generator means for generating an ignore signal in binary form;

means for connecting said ignore signal and the binary source to the control means; and means for connecting said control signal to said generator means to produce said ignore signal and connecting said control signal to the binary source to introduce a delay in binary information transmission therefrom.

4. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source exceeds a predetermined value and producing a control signal when said value is exceeded;

means for connecting the audio source to said analyzer and to the modulator means;

generator means for generating an ignore signal in binary form;

a binary input storage unit;

means for connecting the binary source as an input to said storage unit;

means for connecting said ignore signal, the binary source and the output of said storage unit to the control means; and means for connecting said control signal to the binary source to introduce a delay in binary information transmission therefrom and connecting said control signal to said generator means to produce said ignore signal and connecting said control signal to said storage unit for reading out stored information.

5. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source is of a value to produce excessive modulation for producing a control signal when said value is attained;

means for connecting the audio source to said analyzer and to the modulator means, including a delay unit between the source and the modulator means for delaying the audio signal for a period of time;

a first code generator for generating an ignore signal in binary form;

a second code generator for generating a resume signal in binary form;

means for connecting said ignore and resume signals and the binary source to the control means; and means for connecting said control signal to said generators to produce said ignore and resume signals and connecting said control signal to the binary source to introduce a delay in binary information transmission therefrom.

6. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source is of a value which will produce excessive modulation for producing a control signal when said value is exceeded, and including means for determining the magnitude and polarity and the rate and direction of change of the signal from the audio source;

means for connecting the audio source to said analyzer and to the modulator means;

a first code generator for generating an ignore signal in binary form;

a second code generator for generating a resume signal in binary form;

means for connecting said ignore and resume signals and said binary source to the control means; and means for connecting said control signal to said generator means to produce said ignore and resume signals and connecting said control signal to the binary source to introduce a delay in binary information transmission therefrom.

7. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source is positive and greater than a predetermined value and producing a control signal when said condition exists;

means for connecting the audio source to said analyzer and to the modulator means;

generator means for generating an ignore signal in binary form;

means for connecting said ignore signal and the binary source to the control means; and means for connecting said control signal to said generator means to produce said ignore signal and connecting said control signal to the binary source to introduce a delay in binary information transmission therefrom.

8. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source exceeds a predetermined value and producing a control signal when said value is exceeded;

means for connecting the audio source to said analyzer and to the modulator means;

generator means for generating in binary form an ignore signal indicating that a quantity of previously transmitted information be ignored;

a binary input storage unit for storing such a quantity of information;

means for connecting the binary source as an input to said storage unit;

means for connecting said ignore signal, the binary source and the output of said storage unit to the control means; and means for connecting said control signal to the binary source to introduce a delay in binary information transmission therefrom and connecting said control signal to said generator means to produce said ignore signal and connecting said control signal to said storage unit for reading out to the control means the quantity of information stored therein.

9. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source exceeds a predetermined value and producing a control signal when said value is exceeded;

means for connecting the audio source to said analyzer and to the modulator means;

generator means for generating an ignore signal in binary form;

means for connecting said ignore signal and the binary source to the control means;

means for connecting said control signal to said generator means to produce said ignore signal and connecting said control signal to the binary source to introduce a delay in binary information transmission therefrom; and a receiver for receiving the transmitted radio signal and including a detector and a decoder for reproducing the original input to the transmitter control means, said receiver including a code recognition unit having the decoder output as an input and producing a recognition signal when an ignore signal is received, means for blocking transmission of the decoder output, and means connecting said recognition signal to said blocking means in controlling relation for blocking transmission of said decoder output when an ignore signal is received.

10. In a system for transmitting information in binary form from a binary source and audio frequency information from an audio source on a single carrier, including a binary input delay operative with the binary source for delaying binary information transmission, a carrier frequency oscillator, control means for varying the phase of the oscillator output as a function of input information in binary form to produce a phase shifted carrier within the range of plus and minus 180°, with a positive shift corresponding to one binary state and a negative shift corresponding to the other binary state, and modulator means for amplitude modulating the phase shifted carrier as a function of a variable audio frequency signal to produce a radio signal for transmission, the improvement comprising in combination:

audio signal modulation level analyzer means for determining when the signal from the audio source exceeds a predetermined value and producing a first control signal when said value is exceeded and a second control signal when said value is no longer exceeded;

means for connecting the audio source to said analyzer and to the modulator means;

generator means for generating an ignore signal and a resume signal in binary form;

means for connecting said ignore signal, said resume signal and the binary source to the control means;

means for connecting said control signals to said generator means to produce said ignore signal and said resume signal and connecting said control signals to the binary source to introduce a delay in binary information transmission therefrom; and a receiver for receiving the transmitted radio signal and including a detector and a decoder for reproducing the original input to the transmitter control means, said receiver including a code recognition unit having the decoder output as an input and producing a first recognition signal when an ignore signal is received and producing a second recognition signal when a resume signal is received, means for blocking transmission of the decoder output, and means connecting said recognition signals to said blocking means in controlling relation for blocking transmission of said decoder output when an ignore signal is received and unblocking transmission when a resume signal is received.

11. In a system for transmitting information in binary form from a binary source and audio frequency information from an audio source on a single carrier, the combination of:

means for generating a radio frequency carrier;

means for varying the phase of the carrier as a function of the binary information;

means for amplitude modulating the carrier as a function of the audio frequency information;

means for determining when the modulation exceeds predetermined limits;

means for delaying transmission of the binary information; and means for transmitting control instructions in binary form in place of the binary information.

12. In a system for transmitting information in binary form from a binary source and audio frequency information from an audio source on a single carrier, the combination of:

means for generating a radio frequency carrier;

means for varying the phase of the carrier as a function of the binary information;

means for amplitude modulating the carrier as a function of the audio frequency information;

means for determining when the audio signal exceeds predetermined limits indicating that excessive modulation is imminent;

means for delaying transmission of the binary information; and means for transmitting control instructions in binary form in place of the binary information prior to the excessive modulation.

13. In a system for transmitting information in binary form from a binary source and audio frequency information from an audio source on a single carrier, the combination of:

means for generating a radio frequency carrier;

means for varying the phase of the carrier as a function of the binary information;

means for amplitude modulating the carrier as a function of the audio frequency information;

means for determining when the modulation exceeds predetermined limits;

means for delaying transmission of the binary information;

means for storing the binary information; and means for transmitting control instructions in binary form in place of the binary information and for transmitting the stored information following the control instructions.

14. In a system for transmitting information in binary form from a binary source and audio frequency information from an audio source on a single carrier, the combination of:

means for generating a radio frequency carrier;

means for varying the phase of the carrier as a function of the binary information;

means for amplitude modulating the carrier as a function of the audio frequency information;

means for determining when the audio signal exceeds predetermined limits indicating that excessive modulation will be produced;

means for delaying transmission of the binary information;

means for delaying transmission of the audio signal; and means for transmitting control instructions in binary form in place of the binary information.

No references cited.

ROBERT L. GRIFFIN, *Primary Examiner.*

J. T. STRATMAN, *Assistant Examiner.*